UNITED STATES PATENT OFFICE.

FREDERICK LAIST, OF ANACONDA, MONTANA, ASSIGNOR TO ANACONDA COPPER MINING COMPANY, OF ANACONDA, MONTANA, A CORPORATION OF MONTANA.

PROCESS OF TREATING COMPLEX ORES OR CONCENTRATES THEREFROM.

1,255,446.     Specification of Letters Patent.     Patented Feb. 5, 1918.

No Drawing.     Application filed November 8, 1916. Serial No. 129,339.

*To all whom it may concern:*

Be it known that I, FREDERICK LAIST, a citizen of the United States, residing at Anaconda, in the county of Deerlodge and State of Montana, have invented certain new and useful Improvements in Processes of Treating Complex Ores or Concentrates Therefrom, of which the following is a specification.

This invention is a process whereby the metals zinc, lead, copper, silver and gold are recovered from complex sulfid ores or concentrates therefrom, each of the above metals being recovered separately, either in metallic form, or in the form of a high grade and readily reducible product.

The complex ores or the concentrates resulting therefrom, which generally contain zinc, lead, copper, silver, and gold in varying proportions, are first roasted, and are then treated with a solution containing dilute sulfuric acid in order to dissolve the greater proportion of the zinc. The resulting solution is oxidized in any suitable way, and the iron is precipitated therefrom by addition of zinc oxid, limestone, milk of lime or other appropriate basic reagent. The pulp is then filtered.

The filtrate which contains the greater part of the zinc which was originally present in the ore is further purified by any desired or suitable method, and is subjected to electrolysis for the production of metallic zinc. In this operation, carried out with insoluble anodes, there is formed a dilute sulfuric acid solution which is available for use in the leaching operations.

The residue from the filters contains all of the copper, lead, silver and gold of the original ore, and contains also a material percentage of zinc. This residue is dried, mixed with fine coal, and smelted in either a reverberatory or a blast furnace, preferably the former. There result from this operation:—

(1) a matte containing most of the copper, silver and gold;

(2) a fume consisting principally of oxids of lead and zinc; and (3) a slag which is reasonably free from values.

The matte obtained as above may be worked up for copper, silver and gold in accordance with the usual methods.

The fume is collected in a bag house, or by other suitable means, and is returned to the leaching plant where it is treated with dilute sulfuric acid. The zinc sulfate solution thereby produced joins the solution from the primary treatment of the roasted ore or concentrates; and a residue remains which is a high grade lead product, and contains a very large percentage of the lead originally present in the ore. This product can of course be smelted for its lead content in the usual manner.

I claim:—

The herein described process of recovering zinc, lead, copper and the precious metals from ores or concentrates containing the same, which consists in leaching the roasted ore with dilute sulfuric acid, separating and purifying the resulting zinc-bearing solution and recovering the zinc therefrom by electrolysis; smelting the residue containing the copper, lead, the precious metals and some zinc, and thereby producing a matte containing the copper and precious metals, and a fume consisting largely of oxids of lead and zinc; extracting the zinc from the fume by dilute sulfuric acid, leaving a residue high in lead; and recovering copper and the precious metals from the matte.

In testimony whereof I affix my signature in presence of two witnesses.

FREDERICK LAIST.

Witnesses:
Miss ELLA SCREEN,
R. B. KELLY.